Aug. 27, 1940.  B. SALINSKI  2,212,794

ELECTRICALLY HEATING FOODSTUFFS

Filed Jan. 27, 1939

Inventor,
Bruno Salinski.

By Glascock Downing & Seebold
Attys.

Patented Aug. 27, 1940

2,212,794

UNITED STATES PATENT OFFICE 2,212,794

ELECTRICALLY HEATING FOODSTUFFS

Bruno Salinski, Berlin-Neukolln, Germany

Application January 27, 1939, Serial No. 253,205
In Germany September 25, 1936

6 Claims. (Cl. 219—19)

This invention relates to apparatus for heating solid foodstuffs, more particularly small sausages, by passing an electric current directly through them.

In the apparatus for heating solid foodstuffs, more particularly small sausages, by electrical means, by passing a current directly through them, the foodstuffs are according to the invention placed loose in an open vessel of water in their longitudinal direction, and held between electrodes, which are arranged in contact with their ends, and one of which is fixed in the receptacle, while the other is movable, and can be shifted under the action of the expansion of the foodstuff that occurs when the latter is heated. Furthermore switching means for controlling the heating current on and off is provided, which can be interrupted by means of the movable electrode. With this apparatus it is possible to heat small sausages for example to a temperature ready for eating in an exceedingly short time, for instance about twelve to fifteen seconds. The expanding sausage or the like switches off the current, upon attaining the desired temperature, by means of the movable electrode, and it is possible, by means of this apparatus, to heat foodstuffs, such as sausages, quickly, cheaply and hygienically for immediate consumption.

The invention is illustrated by way of example in the accompanying drawing, in which Figure 1 shows the apparatus as a whole in sectional elevation.

Figure 1:
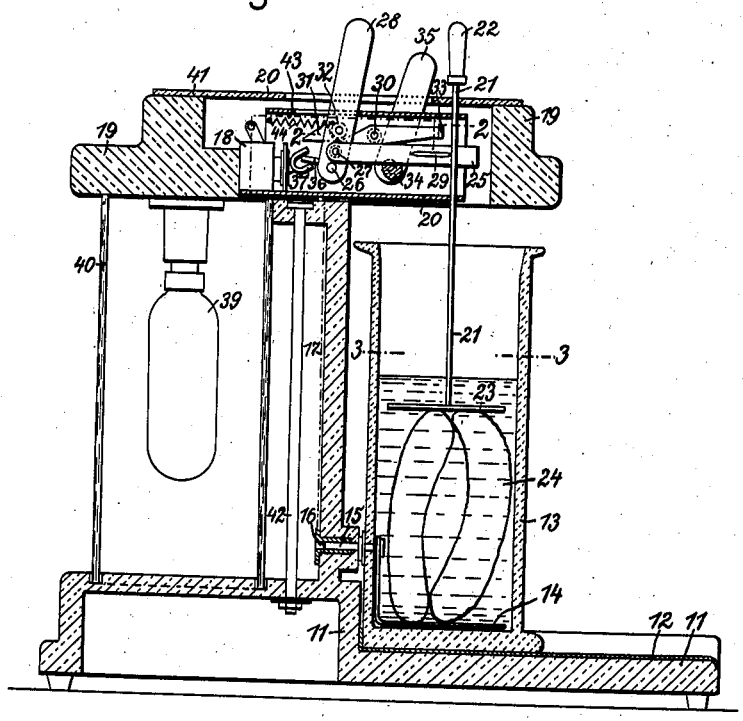

On a frame 11 is arranged a guiding path 12 for a container 13 of tubular form, which in the example illustrated is adapted to contain small sausages. On the bottom of this container lies a fixed electrode 14, which, when the container 13 is slid into the frame 11, engages by means of a plug 15 in a socket 16, and thereby receives a supply of current from a conductor 17, which is connected to a switch 18. In a cover 19, which is secured to the frame 11, a housing 20 is arranged, which may be of U-shaped cross section, and in which is guided a rod 21, which is attached to a movable electrode 23, and is provided with a handle 22. The movable electrode 23 bears upon the top ends of the sausages 24 placed in the container 13. In the housing 20 is pivotally mounted at 26 a hand lever 28, to which is pivoted at 27 a gripping lever 25, which embraces the rod 21 like a fork, as shown in Figure 2. The gripping lever 25 leaves the rod 21 free in the switched off position, but grips it firmly by means of inwardly projecting ledges 29 when the handle 28 is rocked to the right, as in Figure 1. In this position the handle 28 engages with a pin or roller 32 in a detent 31, and is thereby held fast in its locked position. The detent 31 is pivotally mounted at 30 on the housing 20, and extends with a tappet 33 at a certain distance above the gripping lever 25. The hand lever 28 engages with a pin 36 in a fork 37 of the switch 18 of any convenient kind, for instance a lever key switch.

When the hand lever 28 is rocked towards the right the lever key switch 18 is closed, thereby closing a circuit through the electrodes, this circuit leaving from the switch 18 through a conductor 43 to the gripping lever 25, and from the latter through the rod 21, the movable electrode 23, the sausages 24 and the fixed electrode 14, and back through the conductor 17 to the switch 18, which is connected to the mains by means of a flexible lead, not shown, equipped with a plug.

When the sausages 24 have become hot, they raise the electrode 23 and the rod 21. The latter moves the gripping lever 25 upwardly, which strikes against the tappet 33, and pushes the detent 31 away from the roller 32, so that the gripping lever 25 is moved into the left hand position under the action of a spring 44. At the same time the hand lever pushes the lever key switch 18 into the released position by means of the fork 37, and the current is switched off.

Figure 2:
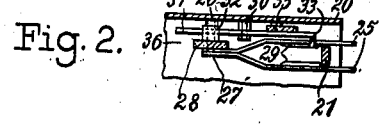
Figure 2 is a partial horizontal section taken on the line 2—2 in Figure 1.

To the switch 18 there may advantageously be connected, as illustrated in Figure 1, a glow lamp 39, which is switched on and off simultaneously with the heating current, thus indicating when the sausages are being heated. The lamp 39 may be surrounded by a transparent tube 40, which may be utilized for advertising purposes. The cover 19 is closed by a plate 41.

In order to enable the lift of the electrode 23 to be adapted to different kinds of sausages, the height of the gripping lever 25 is made adjustable, for instance by means of an eccentric 34, which can be moved by means of a handle 35 into two or more different positions. The travel of the electrode 23 thereby admits of being adjusted as required to an extent of several millimetres, so that with sausages having a relatively thick and tough skin the movable electrode 23 need only execute a stroke of about two millimetres. In other cases the lift may be increased to four or more millimetres.

Figure 3:
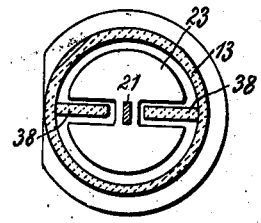
Figure 3 is a horizontal section through the container, above the level of the movable electrode, showing a modification of the apparatus represented in Figure 1.

The container 13 admits of being designed for the simultaneous heating of a plurality of pairs of sausages by subdividing it, for instance by means of radial partitions 38, as indicated in Figure 3. The electrode 23 is then correspondingly slotted, as shown.

Since the electrodes 14 and 23 bear firmly against the foodstuff, and the electrical conductivity of the latter is better than that of the water bath, the heating is directly effected in the foodstuff itself. The water bath is only heated by the heat transferred to it from the foodstuff, and thus becomes gradually hotter in the course of time, after which, when the apparatus receives a fresh charge of foodstuff, the latter is also heated by conduction from the water. Moreover the foodstuff is also moistened by the water, thus increasing its electrical conductivity, and also preventing sparking and burning at the points of contact between the electrodes and the foodstuff.

The receptacle 13 is of such dimensions that it encloses the foodstuff to be heated rather closely at the sides, and in this way only permits it to expand in the longitudinal direction of the receptacle.

After the current has been switched on, the foodstuff expands in consequence of the heating, and presses more or less strongly, according to the degree of heat, against the upper electrode 23. This has the result that after the foodstuff has attained the desired temperature the upper electrode 23 is raised, and with it, in the manner hereinbefore described, the gripping lever 25 and the tappet 33 on the disconnecting lever, thus pushing the detent 31 away from the roller 32, and enabling the spring 44 to retract the handle 28, thereby throwing over the switch lever 37, and cutting off the current.

The receptacle 13 admits of being readily removed laterally for cleaning, after drawing out the movable electrode 23. It may be so designed as to accommodate one pair of sausages only or any convenient number of pairs. Alternatively a number of similar receptacles might be arranged side by side, arrangements being similarly made for the simultaneous release of their electrodes. The cell or receptacle 13 is preferably filled with water up to such a level that the sausages placed therein are just immersed.

What I claim is:

1. Apparatus for electrically heating or cooking foodstuffs comprising a frame, a receptacle adapted to contain the foodstuffs supported by the frame, a fixed electrode at one end of the receptacle, an electrode movable in the longitudinal direction of the receptacle near the other end of the latter, a rod carrying the movable electrode and guided longitudinally in the frame, an electric circuit including a source of current and the fixed electrode and the movable electrode and its rod, an electrically conducting lever adapted in one position to grip the movable electrode rod after the movable electrode has been brought into contact with the foodstuff to be heated, the circuit being completed through the foodstuff placed in the receptacle when its opposite ends are in contact with the electrodes, a handle for shifting the lever into and out of engagement with said rod, a detent adapted to retain said handle in the position corresponding to the position of gripping lever, means such as a spring tending to shift the said handle to the position in which the lever releases the movable electrode rod, a switch controlling the circuit, an arm so mounted in the frame as to be rocked by the lever when the latter is moved by the movable electrode rod as a result of the expansion of the foodstuff under the influence of heat, the arm being adapted when so rocked to withdraw the detent from the handle, thereby permitting the handle-shifting means to cause the lever to release the movable electrode rod, and a switch-actuating member so connected with the handle as to open the controlling switch when the handle is automatically shifted after being released from the detent.

2. Apparatus for heating or cooking solid foodstuffs as claimed in claim 1, further comprising an eccentric for varying the initial position of the lever, so as to vary the travel of the movable electrode rod occurring before the lever actuates the arm.

3. Apparatus for heating or cooking sausages by passing electric current directly through them, comprising, a receptacle adapted to contain the sausages immersed in water, at least one vertical partition dividing the interior of the receptacle into a plurality of intercommunicating compartments, each adapted to contain two sausages standing on end, a fixed electrode occupying substantially the whole area of the bottom of the receptacle, an electrode movable in a vertical direction in the upper portion of all the compartments, said vertical partition and the movable electrode both being slotted to allow the movable electrode to descend below the top of the partition, an electric circuit including a source of current and the two electrodes, the circuit being completed through the sausages in the receptacle with their lower ends resting on the fixed electrode when the movable electrode is lowered into contact with their upper ends, a switch controlling the circuit, and a switch-actuating member so connected with the movable electrode that when the movable electrode is displaced by the longitudinal expansion of the sausages under the influence of heat the switch is automatically opened.

4. In apparatus for heating sausage the combination of, a frame, a receptacle supported by the frame for receiving the sausage, a fixed electrode at one end of the receptacle adapted to be engaged by one end of the sausage, a second electrode guided in said frame and movable longitudinally of the receptacle and adapted to be moved into engagement with the other end of the sausage, an electric circuit for supplying current to said electrodes to heat the sausage whereby the same expands and moves the second electrode away from the fixed electrode, a switch in said circuit, and means responsive to a predetermined expansion of the sausage and a corresponding movement of the second electrode for opening said switch.

5. In apparatus for heating sausage the combination of, a frame, a receptacle supported by the frame for receiving the sausage, a fixed electrode at one end of the receptacle adapted to be engaged by one end of the sausage, a second electrode guided in said frame and movable longitudinally of the receptacle and adapted to be moved into engagement with the other end of the sausage, an electric circuit for supplying current to said electrodes to heat the sausage whereby the same expands and moves the second electrode away from the fixed electrode, a switch in said circuit operably responsive to a predetermined expansion of the sausage and a corresponding movement of the second electrode for opening said switch.

6. In apparatus for heating sausage the combination of, a frame, a receptacle supported by the frame for receiving the sausage, a fixed electrode at one end of the receptacle adapted to be engaged by one end of the sausage, a second electrode guided in said frame and movable longitudinally of the receptacle and adapted to be moved into engagement with the other end of the sausage, an electric circuit for supplying current to said electrodes to heat the sausage whereby the same expands and moves the second electrode away from the fixed electrode, and means operably responsive to a predetermined longitudinal expansion of the sausage and a corresponding movement of the second electrode for opening said circuit.

BRUNO SALINSKI.